United States Patent Office 3,356,371
Patented Dec. 5, 1967

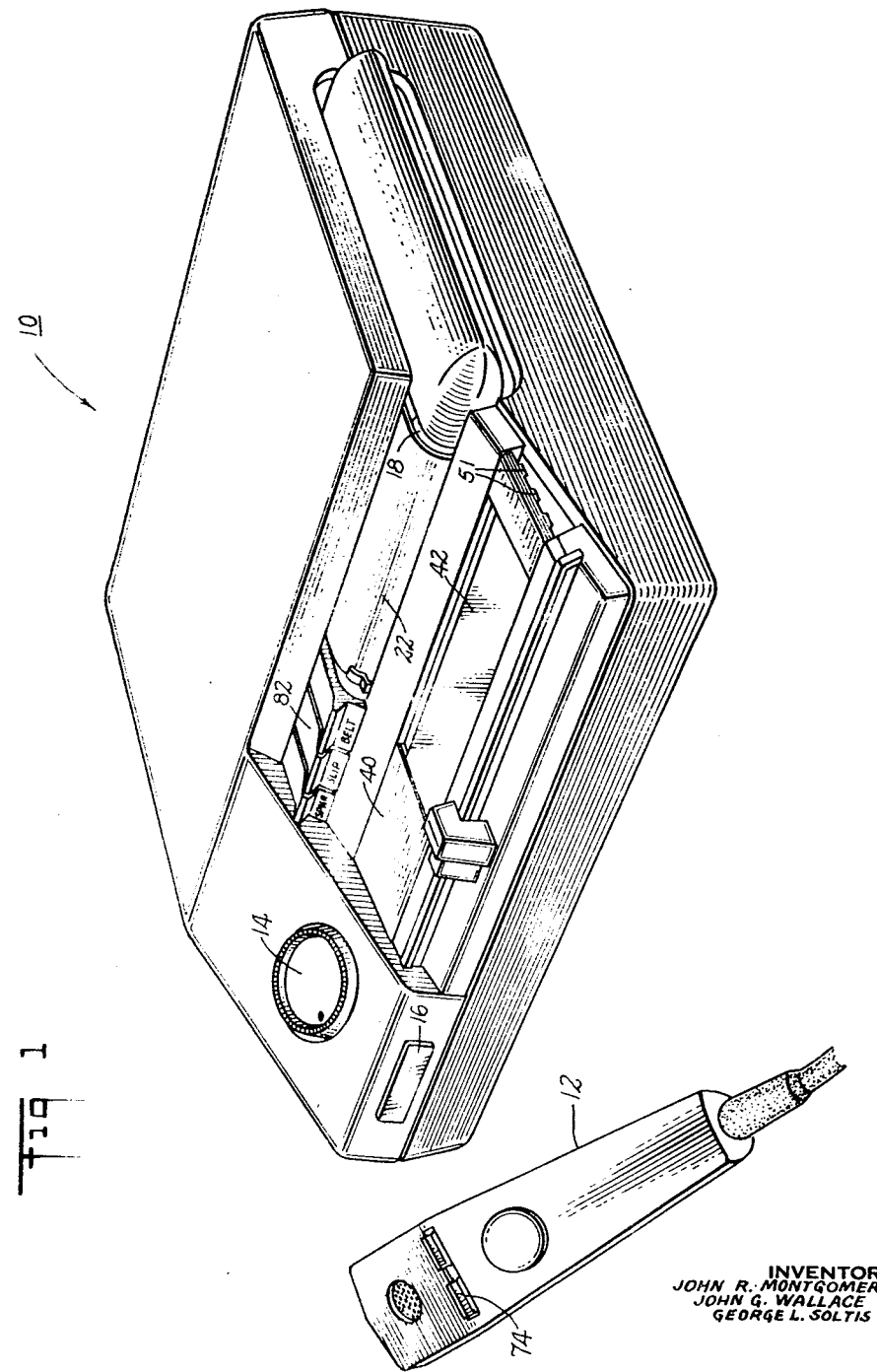

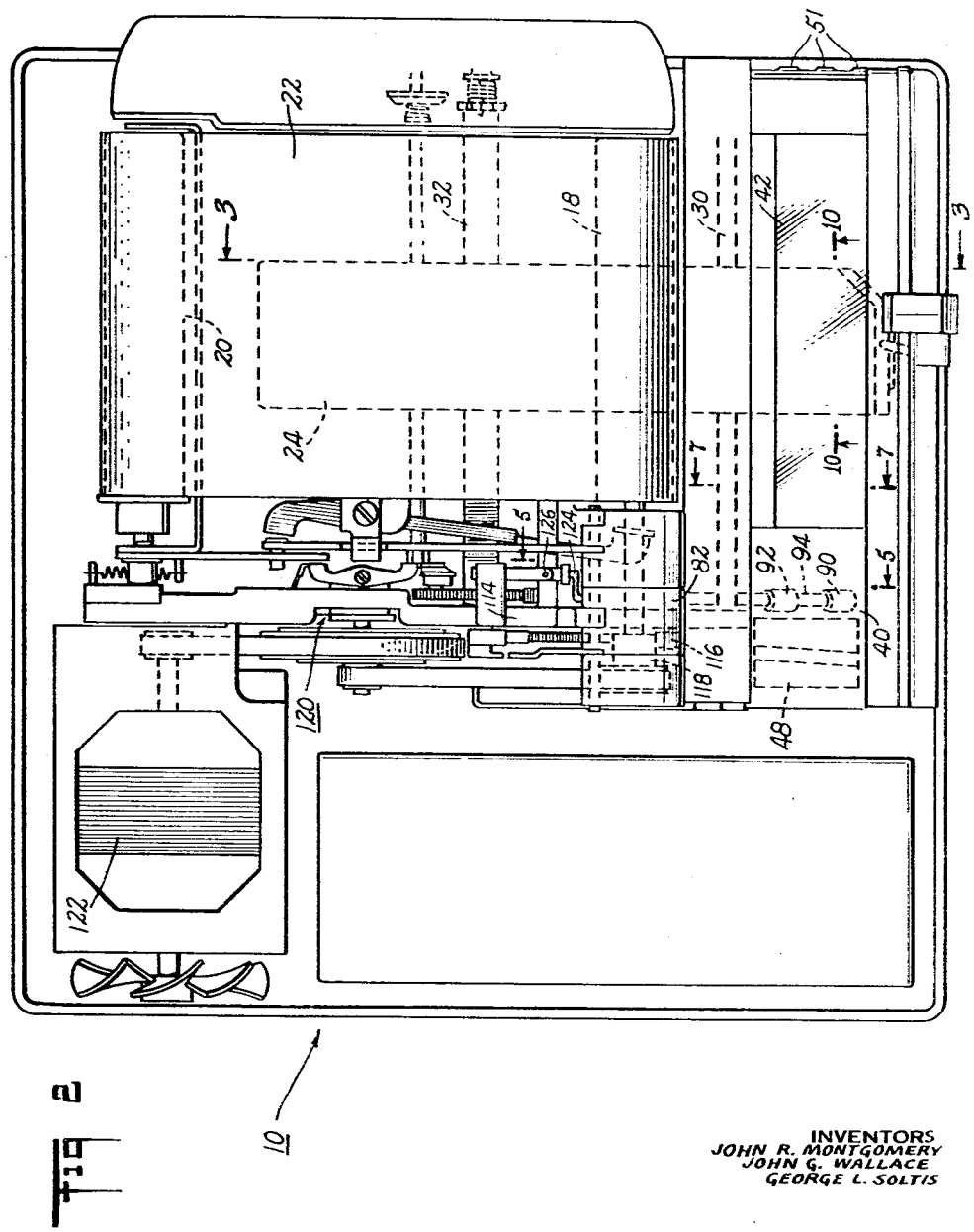

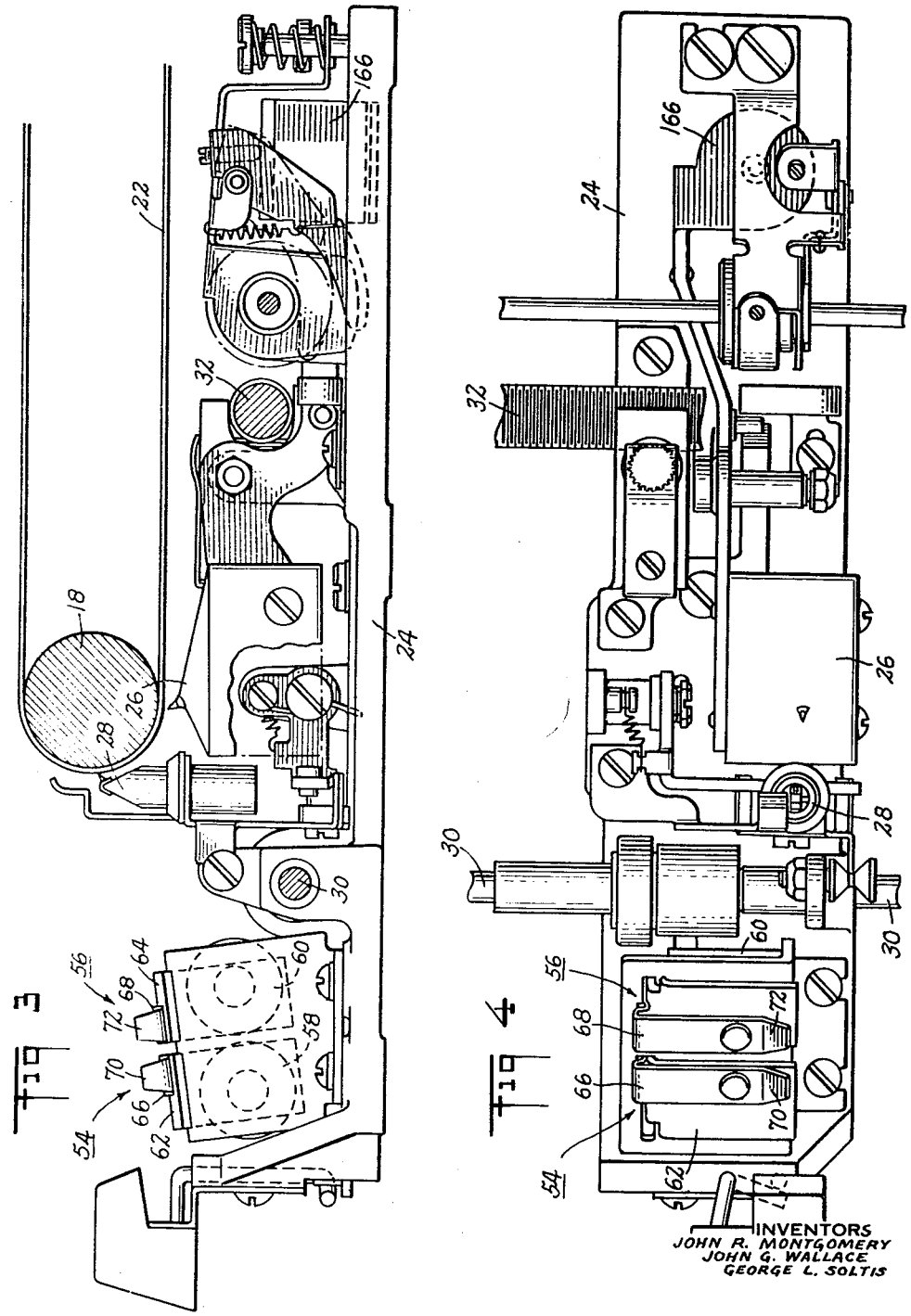

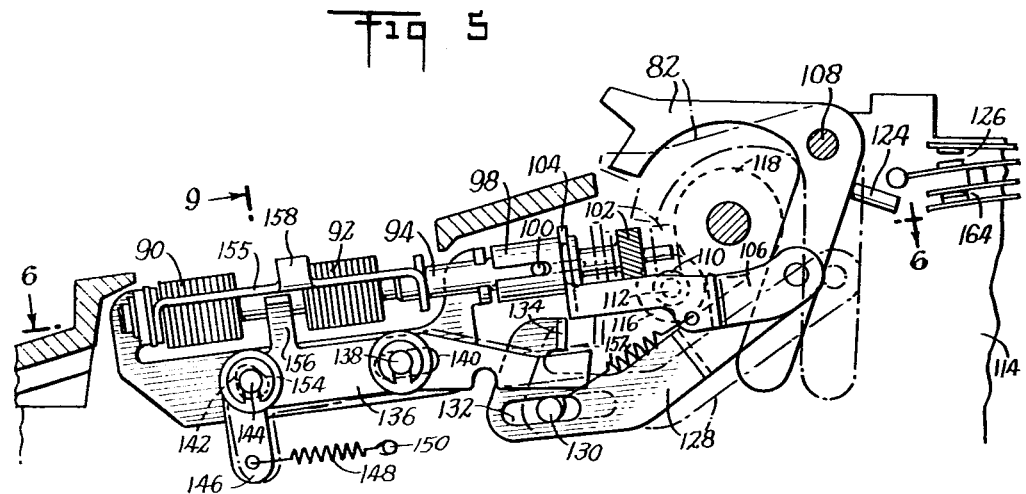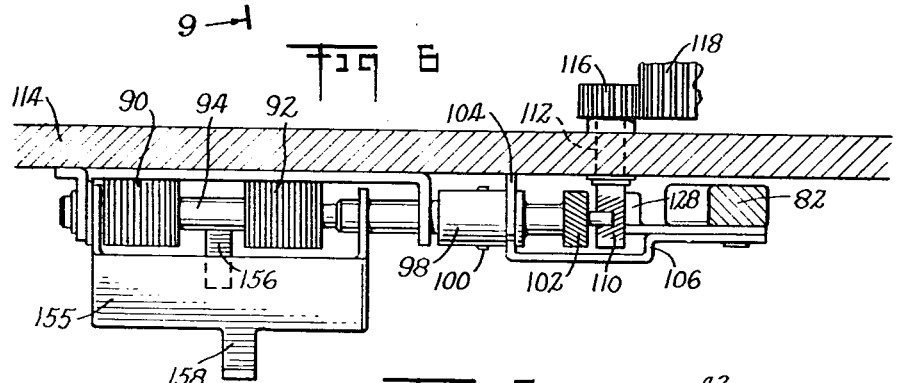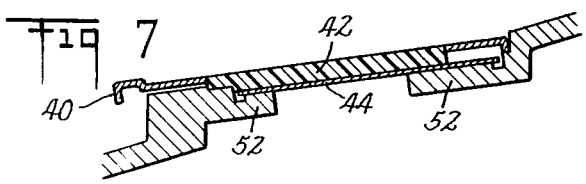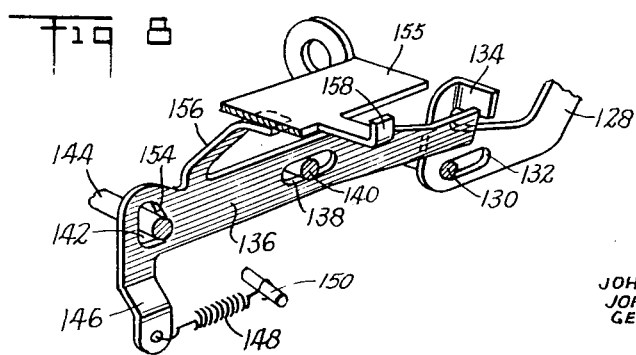

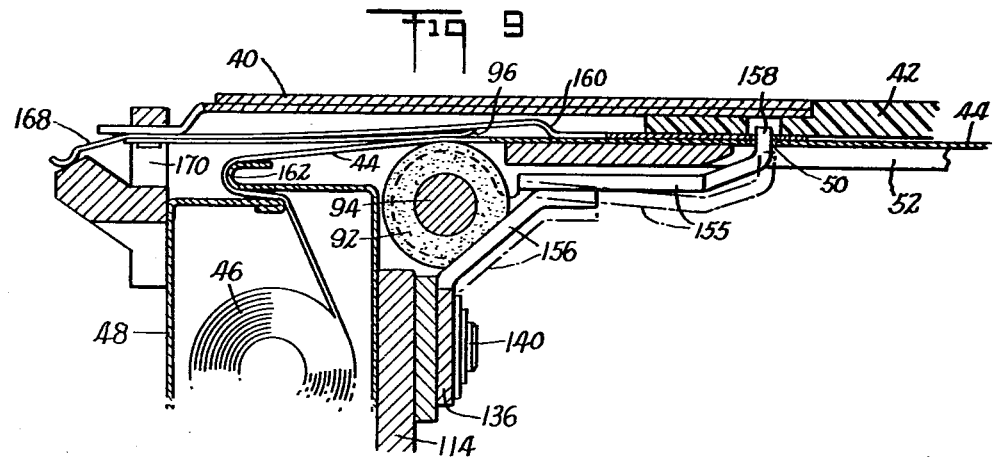
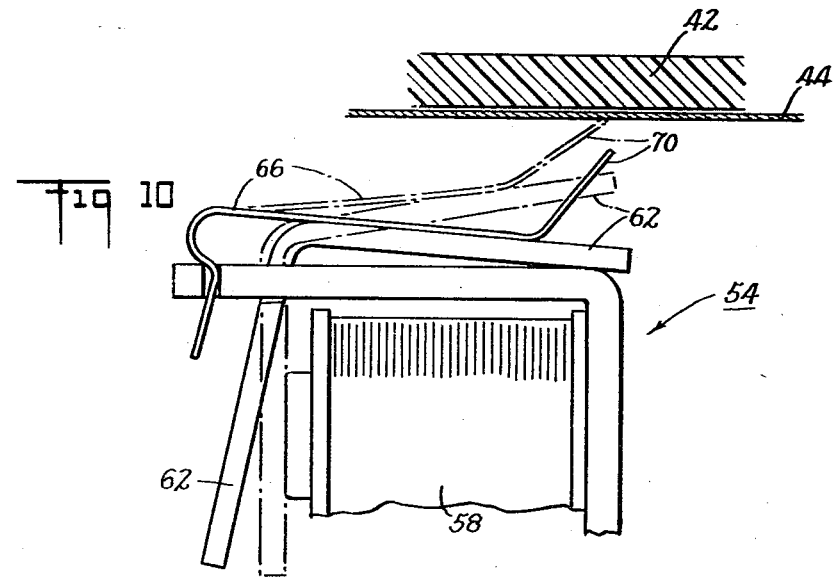
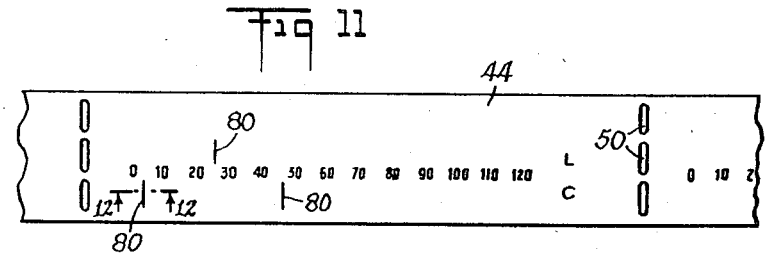
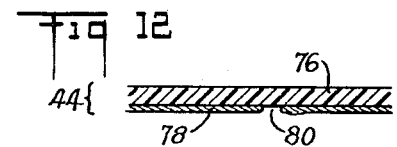

3,356,371
DICTATING MACHINE WITH AUTOMATIC
FEED FOR INDICATOR SLIPS
John R. Montgomery, Trumbull, John G. Wallace, Branford, and George L. Soltis, Shelton, Conn., assignors to Dictaphone Corporation, Bridgeport, Conn.
Original application May 21, 1962, Ser. No. 196,426, now Patent No. 3,254,347, dated May 31, 1966. Divided and this application June 22, 1965, Ser. No. 492,347
9 Claims. (Cl. 274—11)

ABSTRACT OF THE DISCLOSURE

A dictating machine having a sound record and an indicator slip positioned nearby to be marked by a stylus to indicate the locations on the sound record of certain events, said indicator slip being one of a plurality of such slips provided in the form of a continuous roll of sequential slips from which a fresh slip can be drawn, there also being provided a manually-actuable drive mechanism for drawing from the supply roll a single fresh indicator slip which is automatically stopped in proper position for marking.

This invention relates to dictating machines wherein the dictated material is recorded on a moving record and is a division of our copending application Ser. No. 196,-426, filed May 21, 1962, now U.S. Patent No. 3,254,347, granted May 31, 1966. More in particular, this invention relates to means for identifying the location on the record of certain events, such as a correction to the dictated material or the end of a letter, as an aid to the transcribing secretary in typing the recorded dictation.

A variety of indicating arrangements have been used for this purpose over the years, most of which include a slip of paper which is punched or otherwise marked to indicate the desired data. One of the most successful of the prior arrangements makes use of a pad of "correction" slips secured to the machine housing in view of the dictator. A marking device is positioned above the top slip on the pad and is mounted for movement with the recording head as it traverses across the record during dictation. If the dictator wishes to identify to the transcribing secretary the location of some special occurrence, such as a recorded correction or the end of a letter, he operates the marking device to form a visible mark on the correction slip corresponding to the position of the recording head at the time the mark is made. When the dictation is completed, the record and marked indicator slip are removed and given to the transcribing secretary who places them on the transcribing (reproducing) machine. This machine includes means for correlating the position of the marks on the indicator slip with the positioning of the reproducing head, so that the transcribing secretary will have advance notice of the correction or end-of-letter, and thus will be able to work out the final typed copy more effectively.

Although the indicating arrangements used heretofore have been accepted by the user, they have had certain inherent disadvantages including, for many arrangements, a relatively high cost of manufacture. Accordingly, it is an object of this invention to provide dictation apparatus which is superior to that provided heretofore. Another object of this invention is to provide an indicator slip arrangement that is economical to manufacture, and simple to operate. Still another object of this invention is to provide an improved indicator slip arrangement adapted to enhance the appearance of the dictating machine. Other objects, aspects and advantages of the invention will in part be pointed out in, and in part apparent from, the following description considered together with the accompanying drawings, in which:

FIGURE 1 is a perspective view showing a dictating machine incorporating the invention;
FIGURE 2 is a horizontal section taken beneath the top of the machine housing, and showing a plan outline of the major components of the machine;
FIGURE 3 is a cross-section taken along line 3—3 of FIGURE 2, showing the movable carriage with the marker devices mounted thereon;
FIGURE 4 is a plan view of the carriage;
FIGURE 5 is a detail section showing the slip drive mechanism;
FIGURE 6 is a top view of the slip drive mechanism,
FIGURE 7 is a cross-section showing the channel through which the slip moves;
FIGURE 8 is a perspective view of the sensing device for determining when a complete strip portion has been fed into position;
FIGURE 9 is a detail section showing the supply roll of indicator slips and the sensing device;
FIGURE 10 is a detail section showing the operation of the electromagnetic marking devices;
FIGURE 11 is a plan view of a section of the strip of indicator slips; and
FIGURE 12 is a cross-section of the slip taken along line 12—12 of FIGURE 11.

Referring now to FIGURE 1, there is shown a dictating machine 10 having a hand microphone 12 provided with the usual operating controls. A knob 14 at the front of the machine housing serves as a volume control. Beneath this knob is an indicator light 16 which glows to show that the machine has been turned on.

Referring also to FIGURE 2, the machine 10 includes a pair of mandrels 18 and 20 on which is mounted a belt record 22. Beneath this record is a carriage 24 (FIGURES 3 and 4) having a recording head 26 and a reproducing head 28 adapted to engage the record. The carriage is supported on a guide rod 30 and a feedscrew 32 for traversing movement with respect to the record. A complete description of the operating mechanisms not directly involved in the present invention is given in copending application Ser. No. 196,189, filed by William F. Wolfner II, John G. Wallace, George L. Soltis and Merle H. Griswold, on May 21, 1962, now U.S. Patent No. 3,256,025.

At the front of the machine 10 is a removable cover plate 40 having secured thereto a transparent plastic panel 42 through which is visible an indicator slip 44 (FIGURE 11) provided with the usual printed symbols. This slip forms part of a long strip of similar slips which is wound in a supply roll 46 (FIGURE 9) carried in a replaceable magazine 48. As shown in FIGURE 11, the ends of each complete slip are designated by three holes 50 which are punched in a line extending across the lateral width of the strip.

The marginal edges of the lower surface of the slip 44 are supported on a platen 52 (FIGURE 7) in the form of a pair of parallel side-by-side deck plates, thus leaving the central region of the slip accessible from within the machine housing. These deck plates are shaped to form a recessed longitudinal channel for free movement of the slip, providing a vertical clearance of about .004" above a slip having a thickness of about .003". The front edge of the transparent panel 42 rests on the deck plate shoulder on the front side of the slip channel, and the rear edge of the cover plate is provided with a down-turned flange which rests on a corresponding rear shoulder.

Beneath the unsupported central region of the slip 44 is a pair of marker devices 54 and 56 (FIGURES 3 and 4) which are mounted on the carriage 24 for movement with the recording head 26. Referring also to FIGURE 10, each of these marker devices includes solenoids 58 and 60. The armatures 62 and 64 of these solenoids carry spring arms 66 and 68 the upper ends of which 70 and 72 are formed with sharp edges extending laterally with respect to the slip 44.

The solenoids 58 and 60 are controlled by a button 74 on the hand microphone 12. When this button is moved up to its "correction" position, one of the solenoids is energized, and when the button is moved down to its "length-of-letter" position, the other solenoid is energized. When a solenoid is energized, its armature 62 is rotated counterclockwise (referring to FIGURE 10) against the force of the spring arm 66, and the sharp upper edge 70 of the spring arm strikes the lower surface of the slip 44 which is backed up by the transparent plastic panel 42.

As shown in FIGURE 12, the indicator slip 44 consists of an upper layer 76 of transparent material and a lower layer 78 of white opaque blushed lacquer. When the sharp edge 70 of the spring arm 66 strikes the lower surface of the slip, it pushes aside the lower opaque layer 78 and thus clears out a region 80 in the shape of a narrow elongated streak. Since the upper layer 76 is transparent, the dark interior of the machine housing causes the cleared-out region 80 to appear from the outside as a dark mark against the light background of the remainder of the slip 44.

It should be noted that, with this arrangement, the upper edge 70 of the spring arm 66 need only move a small distance against the lower layer of the slip, i.e., a distance corresponding to the width of the mark 80. Thus the edge 70 serves essentially to compress the removed material of the lower layer into a spoilbank which adheres to the slip alongside the mark, so that there is little tendency for the scraped-away material to drop into the interior of the machine.

Since the two spring arms 66 and 68 are offset laterally with respect to the longitudinal axis of the slip 44, the marks 80 made by the respective spring arms will correspondingly be offset vertically, as seen from the front of the machine. Thus the transcribing secretary will be able to distinguish between marks which indicate "correction" and marks which indicate "length-of-letter."

When the dictator has completed his dictation, he will remove the record 22 as described in the above-mentioned copending application. To remove the indicator slip 44, the dictator presses a "Slip" button 82 on the front of the machine. This activates a power-operated drive mechanism which feeds the marked-up slip to the right and out of the machine, this drive being stopped automatically when a fresh slip from the roll 46 is properly positioned under the window defined by the transparent panel 42 and the cover plate 40. The marked-up slip may then be torn off from the strip and sent with the record to the transcribing secretary.

Referring now to FIGURE 5, this slip drive mechanism includes a pair of neoprene rollers 90 and 92 mounted side-by-side on a drive shaft 94 and formed with circumferential grooves 1/32" deep, 1/64" wide, and spaced 1/64" apart. These rollers engage the lower surface of the strip of slips 44 (see also FIGURE 9) in a region adjacent the exit opening of the magazine 48 containing the supply roll 46. The strip is pressed down against the rollers by a spring plate 96 secured to the removable cover plate 40. When the rollers rotate, they feed the strip out of the supply roll and under the transparent panel 42 of the cover plate.

The drive shaft 94 is rotatably supported at its front end, and at its rearward end extends into the bore of a tubular member 98 which is slotted to slidably engage a lateral pin 100 on the drive shaft. The tubular member 98 carries a spiral gear 102, and is formed with a peripheral groove in which is fitted a yoke 104 carried on the end of a lever 106 adapted to shift the tubular member axially on the drive shaft 94.

The yoke lever 106 is pivotally pinned to the Slip button 82 so that when this button is pressed down as indicated in dotted outline in FIGURE 5, it rotates about its pivot axis 108 and pulls the yoke lever towards the rear of the machine. This shifts the spiral gear 102 into engagement with a worm gear 110. As shown in FIGURE 6, this worm gear is carried by a shaft 112 which extends through a frame 114 of the machine to a gear 116 engaged with a main gear 118 of the machine drive system. As explained in the above-mentioned copending application, the main gear 118 is driven through an electromagnetic clutch 120 (FIGURE 2) by a motor 122.

The slip button 82 carries an arm 124 which closes switch contacts indicated at 126 which energize the clutch 120 to rotate the main gear 118. This supplies power to the worm gear 110, the spiral gear 102, and the drive shaft 94. Thus the rollers 90 and 92 are rotated to feed the strip of slips 44 out of the supply roll 46.

Pivotally secured to the slip button 82 is a latching lever 128 the motion of which is guided by a pin 130 extending through a slot 132. This lever is formed near its forward end with a horizontally extending latch finger 134 normally positioned above the top surface of a cam lever 136. Referring also to FIGURE 8, this cam lever is formed with a central guide slot 138 through which extends a frame-mounted pin 140, and also is formed near its front end with a cam aperture 142 through which extends a second frame-mounted pin 144.

The cam lever 136 includes at its front end a depending arm 146 the lower end of which is connected to a spring 148 extending towards the rear and fastened at its other end to a frame-mounted pin 150. Spring 148 biases the cam lever in a counterclockwise direction about pin 144, but movement in this direction normally is prevented by the latch finger 134. However, when the latch lever 128 is pulled to the rear by actuation of the slip button 82, latch finger 134 moves from above the cam lever which thus is freed to move up a small amount, i.e., until it reaches the position where the lower surface of the guide slot 138 bears against the pin 140.

The slip button 82 is biased in a clockwise direction by a light spring 152 which is connected between the yoke lever 106 and the machine frame. Thus, when the dictator releases this button after having actuated the mechanism to the latched position shown in FIGURE 8, the finger 134 of the latching lever 128 presses forwardly against the rear end of the cam lever 136. The force of the spring 152 is augmented in this respect by the mechanical force developed by the engagement of the spiral gear 102 and the worm gear 110. These two forces, i.e., the spring force and the gear reaction force, are applied by the finger 134 against the rear end of the cam lever 136 and are of sufficient combined strength to tend to move the cam lever forward against the force of the spring 148.

However, such forward movement of the cam lever 136 can take place only if the front end of the cam lever is free to move up so that the sloping rear face 154 of the cam aperture 142 can ride up on the cam pin 144. While the strip of indicator slips 44 is being fed out of the supply roll 46, the forward end of the cam lever is prevented from moving up any significant amount by a pivotally-mounted plate 155 which rests on a cam lever arm 156, and which is provided with an upstanding tab 158 engaged with the lower surface of the strip. As shown in FIGURE 9, the strip is held down in this region by a spring plate 160 secured to the left-hand end of the cover plate 40.

After a fresh indicator slip 44 has been fed out into proper position under the window formed by the transparent panel 42 and the cover plate 40, the tab 158 moves up through the center hole 50 in the strip and into a corresponding hole in the transparent panel 42. This upward movement of the tab releases the forward end of the cam lever 136 which therefore is moved up by the cam action of the rear face 154 of the cam aperture 142 as the cam lever is moved forward by the force of the latch finger 134. As the front end of the cam lever moves up, its rear end moves down, pivoting about the pin 140 in the guide slot 138.

The latch finger 134 therefore clears the upper edge of the cam lever 136, permitting the latching lever 128 to move forward and return the drive mechanism to normal condition under the biasing action of the spring 152. Accordingly, the spiral gear 102 is disengaged from the worm gear 110, and the rollers 90 and 92 stop. Thereafter, the dictator can tear off the marked-up slip which has been fed out to the right of the machine 10 through an exit opening provided under the cover plate 40 for this purpose. The holes 50 engage corresponding projections 51 at the right-hand end of the cover plate 40, and aid in producing a straight tear line.

Since the indicator slips are stored in the form of a wound roll 46, a slip withdrawn from the roll has a tendency to curl back on itself. To avoid difficulty from this effect, as the strip leaves the roll it is guided around a relatively sharp corner 162 which bends the paper through a reverse curvature with respect to that of the supply roll 46. This reverse bending minimizes the tendency of the strip to curl when it is guided out under the cover plate 40.

Operation of the slip button 82 also opens switch contacts 164 which deenergize the recording solenoid 166 (FIGURE 3). As explained in the above-mentioned application, when this solenoid is deenergized, the stylus of the recording head 26 is held away from the record 22. Thus, even though the record is rotating because the machine clutch is actuated, the recording head cannot alter the record.

When the supply roll 46 of slips has been exhausted, a new roll may readily be inserted. This is accomplished by sliding the cover plate 40 to the right, thus releasing a pair of hooks at the right-hand end of the cover, and then lifting up the cover slightly and pulling it to the right to remove the detent spring 168 from the frame opening 170. Thereafter the cover plate may be put aside and a new roll of slips inserted in the storage area, the free end of the strip being laid out over the platen 52. The cover plate then is replaced as before, it being noted that the detent spring 168 tends to rotate the plate clockwise and thereby urge the plate and its transparent panel 42 down towards the slip lying on the platen.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. In a dictating machine, the combination of a strip of flexible material wound in a roll, means to hold an end portion of said strip in position to be marked to indicate certain events on the dictation record, said strip being provided at uniformly spaced intervals along its length with designation means to define distinct strip portions each forming a complete indicator slip; means for controllably bringing a fresh slip from said roll comprising roller means engaged with said strip and operable when activated to feed said strip from said roll, drive means for supplying power to said roller means, gear means shiftable into engaged position to couple said drive means to said roller means, start means operable to shift said gear means into engaged position, latch means for maintaining said gear means engaged, sensing means to detect said designation means at a predetermined position thereof while said strip is being fed out of said roll, and control means responsive to said sensing means to automatically disengage said gear means when the next one of said designation means has reached said predetermined position.

2. Apparatus as claimed in claim 1, wherein said strip is formed with holes to designate the ends of the slip portion, said sensing means comprising a tab member urged against the inner side of said strip and adapted to enter one of said holes when the slip is in proper position.

3. Apparatus as claimed in claim 2, including spring plate means urged against the outer side of said strip in the region of said tab member, said spring plate means being formed with a hole through which said tab member moves after it passes through the hole in said slip portion.

4. Apparatus as claimed in claim 1, wherein said gear means includes a first gear mounted on the shaft of said roller means and shiftable axially into engagement with a second gear.

5. Apparatus as claimed in claim 1, including a latching lever carried with said gear means and shiftable thereby into a latching position, said latching lever having a latch finger normally located over a cam lever, said latch finger being engageable with the end of said cam lever and urged thereagainst when in said latch position, said cam lever including holding means connected to said sensing means and operable, while the strip is being fed out of said roll, to prevent movement of said cam lever in response to the pressure exerted by said latch finger, said holding means being released by said sensing means at the end of a strip portion and thereby accommodating movement of said cam lever in response to the pressure of said latch finger, said cam lever including cam means to pivot said cam lever and permit said latch finger to ride up over said cam lever and thereby disengage said gear means.

6. Apparatus as claimed in claim 5, wherein said gear means comprises a spiral gear connected to said roller means and slidably mounted for shifting movement, a worm gear adapted to be engaged by said spiral gear, the gear reaction force produced by engagement of said gears serving to urge said latch finger against said cam lever.

7. A dictating machine comprising a housing with means to record dictation, said housing also containing a strip of flexible material wound in a roll; means to hold an end portion of said strip in position to be marked, said strip being provided at uniformly spaced intervals along its length with designation means to define distinct strip portions each forming a complete indicator slip adapted to be marked to indicate certain information relating to the recorded dictation; feeding means for controllably bringing a fresh slip from said roll and including normally energized motor means having a rotating output shaft; drive means adapted when activated to move a fresh slip from said roll and into position to be marked; coupling means having engaged and disengaged conditions, said coupling means in said engaged condition providing a connection between said rotating output shaft and said drive means to transmit motion to said drive means for moving a fresh slip from said roll; start means actuable to place said coupling means in engaged condition to transmit movement from said rotating output shaft to said drive means; latch means responsive to actuation of said start means for holding said coupling means engaged after release of said start means; sensing means to detect said designation means at a predetermined position thereof while said strip is being fed out of said roll by said drive means; and control means responsive to the detection of said designation means by said sensing means, said control means being operable upon such detection of said designation means to automatically de-actuate said latch means and thereby disengage said coupling means to stop said drive means when the next one of said designation means has reached said predetermined position.

8. Apparatus as in claim 7, wherein said coupling means includes an electrically-energizable clutch interposed between said rotating output shaft and said drive means.

9. Apparatus as in claim 7, wherein said coupling means includes gear means shiftable between engaged and disengaged positions, said start means comprising a manually operable lever connected to said gear means and arranged when operated to shift said gear means into engaged position.

References Cited

UNITED STATES PATENTS 1,695,769  12/1928  Mansfield _____ 226—43

M. HENSON WOOD, Jr., *Primary Examiner.*

ALLEN N. KNOWLES, *Examiner.*